(12) United States Patent
Wang et al.

(10) Patent No.: US 10,069,215 B2
(45) Date of Patent: Sep. 4, 2018

(54) MULTI-BEAM ANTENNA SYSTEM AND PHASE ADJUSTMENT METHOD FOR MULTI-BEAM ANTENNA SYSTEM, AND DUAL-POLARIZED ANTENNA SYSTEM

(71) Applicant: HUAWEI TECHNOLOGIES CO., LTD., Shenzhen, Guangdong (CN)

(72) Inventors: Qiang Wang, Chengdu (CN); Jianping Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 15/349,517

(22) Filed: Nov. 11, 2016

(65) Prior Publication Data
US 2017/0062950 A1    Mar. 2, 2017

Related U.S. Application Data

(63) Continuation of application No. PCT/CN2015/078218, filed on May 4, 2015.

(30) Foreign Application Priority Data

May 14, 2014   (CN) .......................... 2014 1 0204330

(51) Int. Cl.
*H01Q 21/24*    (2006.01)
*H01Q 25/00*    (2006.01)
(Continued)

(52) U.S. Cl.
CPC ............. *H01Q 21/24* (2013.01); *H01Q 1/246* (2013.01); *H01Q 3/40* (2013.01); *H01Q 25/00* (2013.01);
(Continued)

(58) Field of Classification Search
CPC ........ H01Q 25/00; H01Q 1/246; H01Q 21/24; H01Q 25/001; H01Q 3/40; H01Q 21/06; H04B 7/04; H04B 7/0617
See application file for complete search history.

(56) References Cited

U.S. PATENT DOCUMENTS 3,731,315 A * 5/1973 Sneleg ................. H01Q 3/40
                                                342/372
4,032,922 A * 6/1977 Provencher .......... H01Q 3/2617
                                                342/373
(Continued)

FOREIGN PATENT DOCUMENTS

CN       102257674      11/2011
CN       102544772       7/2012
(Continued)

OTHER PUBLICATIONS

International Search Report dated Jul. 17, 2015 in corresponding International Application No. PCT/CN2015/078218.
(Continued)

*Primary Examiner* — Tho G Phan
(74) *Attorney, Agent, or Firm* — Staas & Halsey LLP

(57) ABSTRACT

The present invention discloses a multi-beam antenna system, comprising: a one-dimensional multi-beam forming module connected to a radio frequency port, configured to convert a radio frequency signal transmitted by the radio frequency port into M radio frequency signals having different phases; a two-dimensional multi-beam forming module, which includes M first power division units, and a phase shifter is disposed on P output tributaries of each first power division unit; and M×N radiating elements, where the M×N radiating elements form a matrix having N rows and M columns, M columns of radiating elements are respectively connected to the M first power division units, N radiating elements in each column of radiating elements are respec- (Continued)

tively connected to N output tributaries of one first power division unit, and M×P radiating elements connected to output tributaries disposed with a phase shifter form a matrix having P rows and M columns.

8 Claims, 5 Drawing Sheets

(51) Int. Cl.
    *H01Q 3/40*     (2006.01)
    *H01Q 1/24*     (2006.01)
    *H04B 7/06*     (2006.01)

(52) U.S. Cl.
    CPC ......... *H01Q 25/001* (2013.01); *H04B 7/0617* (2013.01)

(56) References Cited

U.S. PATENT DOCUMENTS

| | | | | |
|---|---|---|---|---|
| 4,638,317 A * | 1/1987 | Evans | ............... | H01Q 3/40 333/117 |
| 4,989,011 A * | 1/1991 | Rosen | ............... | H01Q 3/40 342/373 |
| 5,038,150 A * | 8/1991 | Bains | ............... | H01Q 25/001 342/188 |
| 6,340,948 B1 * | 1/2002 | Munoz-Garcia | ....... | H01Q 1/288 342/354 |
| 6,680,698 B2 * | 1/2004 | Eiges | ............... | H01Q 1/28 342/361 |
| 8,786,493 B2 * | 7/2014 | Pu | ............... | H01Q 3/40 342/372 |
| 2004/0027305 A1 | 2/2004 | Pleva et al. | | |
| 2005/0012665 A1 | 1/2005 | Runyon et al. | | |

FOREIGN PATENT DOCUMENTS

| | | |
|---|---|---|
| CN | 102856667 | 1/2013 |
| CN | 202940807 | 5/2013 |
| CN | 103633452 | 3/2014 |
| CN | 103682682 | 3/2014 |
| EP | 3067988 | 9/2016 |
| JP | 58-178604 | 10/1983 |
| JP | 10-82810 | 3/1998 |
| JP | 2007-532031 | 11/2007 |
| WO | 2005/018047 A1 | 2/2005 |
| WO | 2012/168878 | 12/2012 |

OTHER PUBLICATIONS

International Search Report dated Jul. 17, 2015 in corresponding International Patent Application No. PCT/CN2015/078218.
Extended European Search Report dated Mar. 23, 2017, in corresponding European Patent Application No. 15793477.9.
Notice of Reasons for Rejection dated Feb. 6, 2018, in corresponding Japanese Patent Application No. 2016-567653, 8 pgs.

* cited by examiner

MULTI-BEAM ANTENNA SYSTEM AND PHASE ADJUSTMENT METHOD FOR MULTI-BEAM ANTENNA SYSTEM, AND DUAL-POLARIZED ANTENNA SYSTEM

CROSS-REFERENCE TO RELATED APPLICATIONS

This application is a continuation of International Application No. PCT/CN2015/078218, filed on May 4, 2015, which claims priority to Chinese Patent Application No. 201410204330.2, filed on May 14, 2014, The disclosures of the aforementioned applications are hereby incorporated by reference in their entireties.

TECHNICAL FIELD

The present invention relates to the field of communications technologies, and in particular, to a multi-beam antenna system and a phase adjustment method for a multi-beam antenna system, and a dual-polarized antenna system.

BACKGROUND

An antenna is an energy converter, which can transform a guided wave propagated on a transmission line into a spatial electromagnetic wave, or perform inverse transformation. The antenna is used to transmit or receive an electromagnetic wave in wireless communication. Most common conventional antennas in a wireless communications system are: a fiberglass omnidirectional antenna, a directional panel antenna, a small whip antenna, and the like. In most cases, people require that an antenna should have a maximum coverage area and a farthest coverage distance, that is, the antenna has a maximum beam width and a maximum gain, both of which, however, are contradictory for a single-beam antenna.

A multi-beam antenna has a multi-beam radiation capability, which may increase a radiation coverage area without decreasing an antenna gain. However, a radiation coverage area of a conventional multi-beam antenna is still relatively small.

SUMMARY

The present invention provides a multi-beam antenna system and a phase adjustment method for a multi-beam antenna system, and a dual-polarized antenna system, to implement a relatively large radiation coverage area.

To resolve the foregoing technical problem, the present invention uses the following technical solutions:

According to a first aspect, the present invention provides a multi-beam antenna system, including:

a radio frequency port;

a one-dimensional multi-beam forming module connected to the radio frequency port, where the one-dimensional multi-beam forming module includes a multi-beam forming unit and a first phase control unit connected to the multi-beam forming unit, the multi-beam forming unit is configured to convert a radio frequency signal transmitted by the radio frequency port into M radio frequency signals having different phases, M is an integer greater than 1, the multi-beam forming unit has M output ends configured to respectively output the M radio frequency signals, and the first phase control unit is configured to adjust phases of the M radio frequency signals;

a two-dimensional multi-beam forming module connected to the one-dimensional multi-beam forming module, where the two-dimensional multi-beam forming module includes a phase shifter, a second phase control unit connected to the phase shifter, and M first power division units respectively connected to the M output ends in the multi-beam forming unit, where each first power division unit is configured to divide one radio frequency signal into N radio frequency signals, N is an integer greater than 1, each first power division unit has N output tributaries configured to respectively output the N radio frequency signals, the phase shifter is disposed on P output tributaries of the N output tributaries, P is an integer greater than or equal to 1, and the second phase control unit is configured to adjust a phase for the phase shifter to perform phase shifting; and M×N radiating elements connected to the second multi-beam forming module, where the M×N radiating elements form a matrix having N rows and M columns, the M columns of radiating elements are respectively connected to the M first power division units, N radiating elements in each column of radiating elements are respectively connected to the N output tributaries of one first power division unit, and in the matrix having N rows and M columns, M×P radiating elements connected to output tributaries disposed with a phase shifter in the M first power division units form a matrix having P rows and M columns.

With reference to the first aspect, in a first implementation manner of the first aspect, each first power division unit includes a first power divider, where the first power divider has Q output ends, and the first power divider is configured to divide one radio frequency signal into Q radio frequency signals, where Q is an integer greater than 1;

each first power division unit further includes Q second power dividers that are respectively connected to the Q output ends of the first power divider, where each second power divider includes R output ends, and each second power divider is configured to divide one radio frequency signal into R radio frequency signals, where R is an integer greater than 1, and Q×R=N; and in the matrix having N rows and M columns, the N radiating elements in each column of radiating elements are respectively connected to N output ends of the Q second power dividers.

With reference to the first implementation manner of the first aspect, in a second implementation manner of the first aspect, on an output tributary having a phase shifter in each first power division unit, the first power divider is connected to a second power divider by using the phase shifter, or a second power divider is connected to a radiating element by using the phase shifter.

With reference to the second implementation manner of the first aspect, in a third implementation manner of the first aspect, M phase shifters respectively connected to M radiating elements of a same row form a linkage phase shifter, where the linkage phase shifter is configured to enable multiple radio frequency signals to undergo phase shifting with a same phase.

With reference to any one of the first aspect, or the first to the third implementation manners of the first aspect, in a fourth implementation manner of the first aspect, the multi-beam forming unit includes a butler matrix and a one-of-S switch, where the butler matrix is connected to the radio frequency port by using the one-of-S switch;

the butler matrix includes S input ends, where S is an integer greater than 1; and the one-of-S switch includes S output ends, where the S output ends of the one-of-S switch are respectively connected to the S input ends of the butler matrix; and the first phase control unit is connected to a control end of the one-of-S switch, and the first phase control unit is configured to control the one-of-S switch to select one of the S output ends for outputting.

With reference to any one of the first aspect, or the first to the third implementation manners of the first aspect, in a fifth implementation manner of the first aspect, the multi-beam forming unit includes a second power division unit and a phase-shift unit connected to the second power division unit, where the phase-shift unit is connected to the first phase control unit.

According to a second aspect, a dual-polarized antenna system is provided, including two multi-beam antenna systems described above, where radiating elements in one multi-beam antenna system and radiating elements in the other multi-beam antenna system are in a one-to-one correspondence to form a dual-polarized radiating element.

According to a third aspect, a phase adjustment method for a multi-beam antenna system is provided, where the method is used for the foregoing multi-beam antenna system and includes:

adjusting phases of M radio frequency signals formed by a multi-beam forming unit, so that the M radio frequency signals have different phases; and performing phase shifting on P radio frequency signals of N radio frequency signals in each first power division unit, and in M first power division units, performing same-phase phase shifting on M radio frequency signals of M radiating elements that are output to a same row.

According to the multi-beam antenna system and the phase adjustment method for a multi-beam antenna system, and the dual-polarized antenna system that are provided in the present invention, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention.

Embodiment 1

Figure 1:
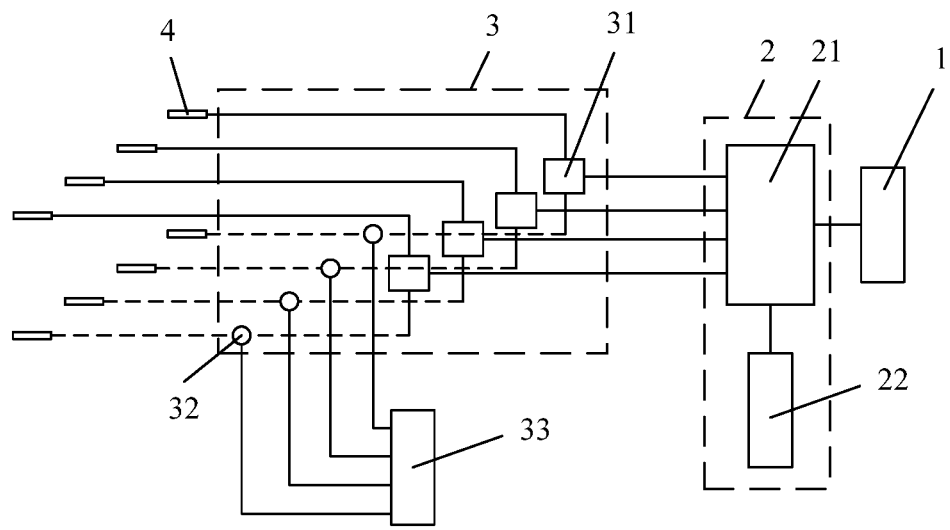
FIG. 1 is a schematic structural diagram of a multi-beam antenna system according to Embodiment 1 of the present invention.
Figure 2:
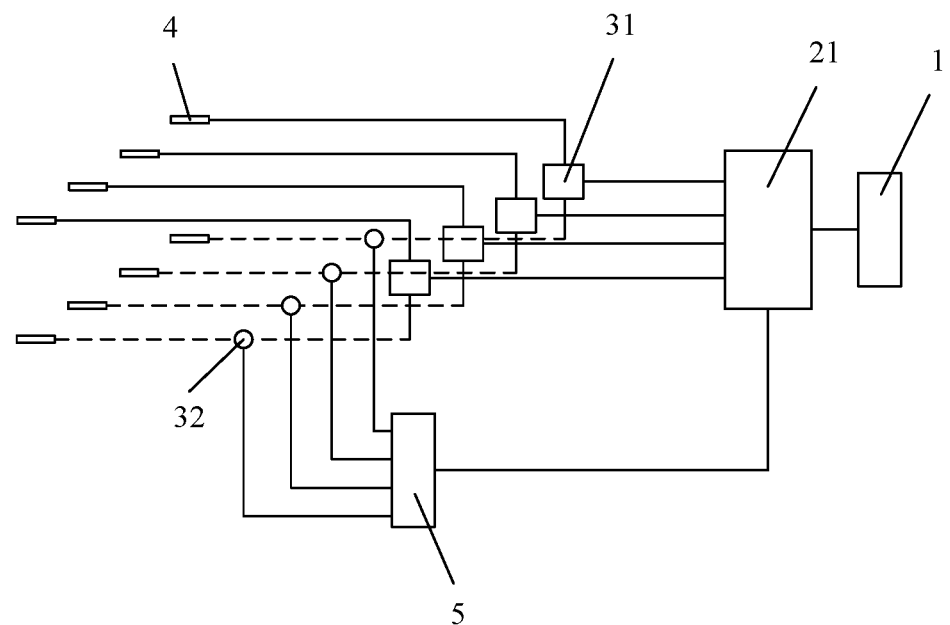
FIG. 2 is a schematic structural diagram of another multi-beam antenna system according to Embodiment 1 of the present invention.

As shown in FIG. 1, this embodiment of the present invention provides a multi-beam antenna system, including: a radio frequency port 1; a one-dimensional multi-beam forming module 2 connected to the radio frequency port 1, where the one-dimensional multi-beam forming module 2 includes a multi-beam forming unit 21 and a first phase control unit 22 connected to the multi-beam forming unit 21, the multi-beam forming unit 21 is configured to convert a radio frequency signal transmitted by the radio frequency port 1 into M radio frequency signals having different phases, M is an integer greater than 1, the multi-beam forming unit 21 has M output ends configured to respectively output the foregoing M radio frequency signals, and the first phase control unit 22 is configured to adjust phases of the foregoing M radio frequency signals; a two-dimensional multi-beam forming module 3 connected to the one-dimensional multi-beam forming module 2, where the two-dimensional multi-beam forming module 3 includes a phase shifter 32, a second phase control unit 33 connected to the phase shifter 32, and M first power division units 31 respectively connected to the M output ends in the one-dimensional multi-beam forming unit 2, where each first power division unit 31 is configured to divide one radio frequency signal into N radio frequency signals, N is an integer greater than 1, each first power division unit 31 has N output tributaries configured to respectively output the foregoing N radio frequency signals, the phase shifter 32 is disposed on P output tributaries of the foregoing N output tributaries, P is an integer greater than or equal to 1, and the foregoing second phase control unit 33 is configured to adjust a phase for the phase shifter 32 to perform phase shifting; and M×N radiating elements 4 connected to a second multi-beam forming module 3, where the M×N radiating elements 4 form a matrix having N rows and M columns, the M columns of radiating elements 4 are respectively connected to the M first power division units 31, N radiating elements in each column of radiating elements 4 are respectively connected to the N output tributaries of one first power division unit 31, and in the foregoing matrix having N rows and M columns, M×P radiating elements 4 connected to output tributaries disposed with a phase shifter 32 in the foregoing M first power division units 31 form a matrix having P rows and M columns. It should be noted that, the foregoing first phase control unit 22 and the second phase control unit 33 may be two separate units, which respectively provide the multi-beam forming unit 21 and the phase shifter 32 with corresponding control signals; or as shown in FIG. 2, the foregoing first phase control unit and the second phase control unit are a same phase control unit 5, and respectively provide the multi-beam forming unit 21 and the phase shifter 32 with corresponding control signals.

Specifically, first, the radio frequency port 1 transmits a radio frequency signal to the multi-beam forming unit 21, the multi-beam forming unit 21 converts the radio frequency signal into M radio frequency signals having different phases and respectively transmits the M radio frequency signals to M first power division units 31, and each first power division unit 31 divides one received radio frequency signal into multiple radio frequency signals. One or more (only one is shown in FIG. 1) radio frequency signals after power division are directly transmitted to corresponding radiating elements 4, another one or more radio frequency signals after the power division are transmitted to corresponding radiating elements 4 after the phase shifter 32 performs phase shifting, and M×N radiating elements 4 radiate respective received radio frequency signals. A maximum gain of multiple radiating elements in a same direction is determined by a phase difference between radio frequency signals of these radiating elements. First, the multi-beam forming unit 21 sets M radio frequency signals output by the one-dimensional multi-beam forming module 2 to different phases, and then the phase shifter 32 performs phase shifting on radio frequency signals on P output tributaries in each first power division unit 31, and in M first power division units 31, same-phase phase shifting is performed on M radio frequency signals of M radiating elements 4 that are output to a same row, so as to ensure that the phase shifter 32 does not change a phase difference between the M radio frequency signals of the M radiating elements 4 in the same row.

For example, as shown in FIG. 1, M=4, N=2, P=1, and phases of four radio frequency signals output by the one-dimensional multi-beam forming module 2 are respectively −45 degrees, −90 degrees, −135 degrees, and −180 degrees. In the first power division unit 31, each radio frequency signal is divided into a first radio frequency signal and a second radio frequency signal that have a same phase. Four first radio frequency signals are respectively output to four radiating elements 4 in a first row, and four second radio frequency signals undergo phase shifting with a phase of 10 degrees and are respectively output to four radiating elements 4 in a second row. Phases of four radio frequency signals received by the four radiating elements 4 in the first row are respectively −45 degrees, −90 degrees, −135 degrees, and −180 degrees. Phases of four radio frequency signals received by the four radiating elements 4 in the second row are respectively −35 degrees, −80 degrees, −125 degrees, and −170 degrees. In a matrix, a maximum gain direction of a row or a column of radiating elements is determined by a phase difference of radio frequency signals of multiple radiating elements in the row or the column. Therefore, a maximum gain direction of a first dimension (transverse) is adjusted and determined by the one-dimensional multi-beam forming module 2, and a maximum gain direction of a second dimension (longitudinal) is adjusted and determined by the two-dimensional multi-beam forming module 3, thereby implementing separate adjustment of maximum gain directions of two dimensions.

According to the multi-beam antenna system in this embodiment, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area.

Embodiment 2

Figure 3:
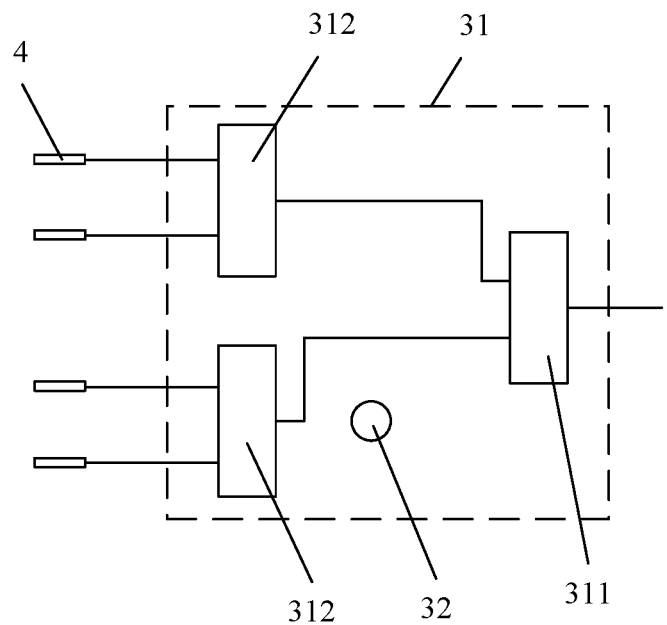
FIG. 3 is a schematic structural diagram of a first power division unit according to Embodiment 2 of the present invention.
Figure 4:
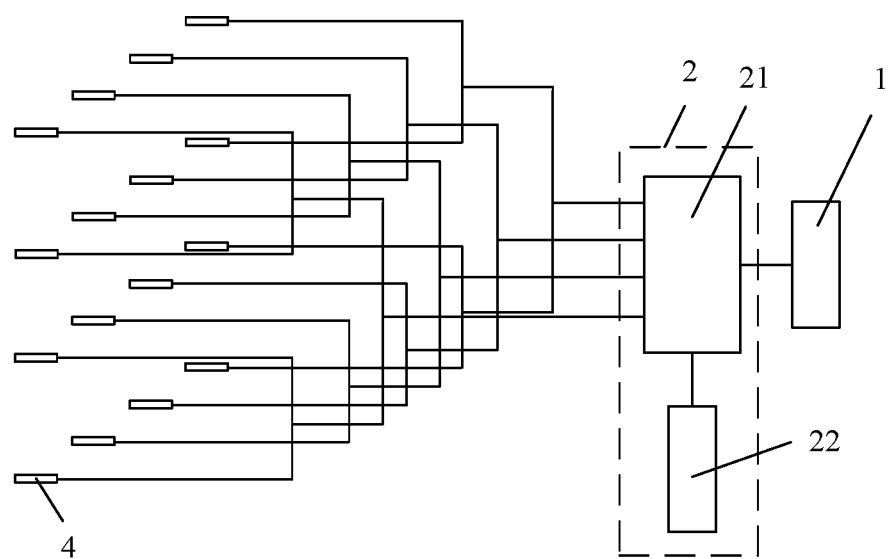
FIG. 4 is a schematic structural diagram of a multi-beam antenna system according to Embodiment 2 of the present invention.

On the basis of Embodiment 1, specifically, as shown in FIG. 3, each first power division unit 31 includes a first power divider 311, where the first power divider 311 has Q output ends, and the first power divider 311 is configured to divide one radio frequency signal into Q radio frequency signals, where Q is an integer greater than 1; each first power division unit 31 further includes Q second power dividers 312 that are respectively connected to the Q output ends in the first power divider 311, where each second power divider 312 includes R output ends, and each second power divider 312 is configured to divide one radio frequency signal into R radio frequency signals, where R is an integer greater than 1, and Q×R=N; and as shown in FIG. 4, in the foregoing matrix having N rows and M columns, N radiating elements 4 in each column of radiating elements 4 are respectively connected to N output ends of the Q second power dividers (the second power divider is not shown in FIG. 4).

Figure 5:
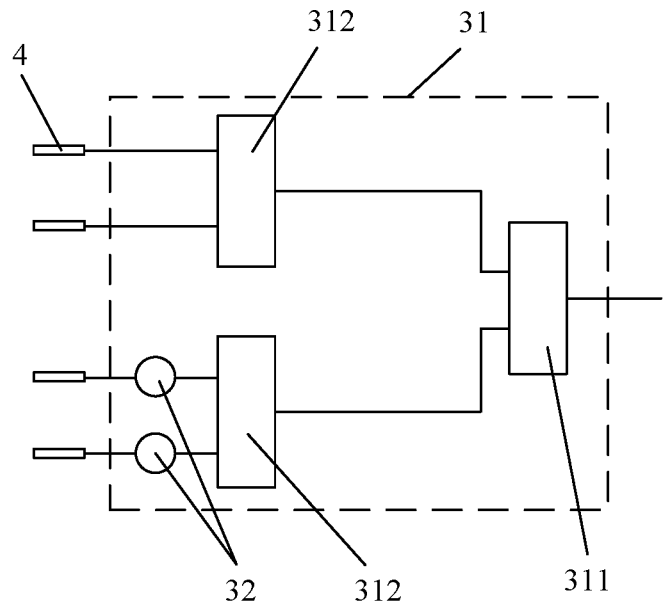
FIG. 5 is a schematic structural diagram of another first power division unit according to Embodiment 2 of the present invention.
Figure 6:
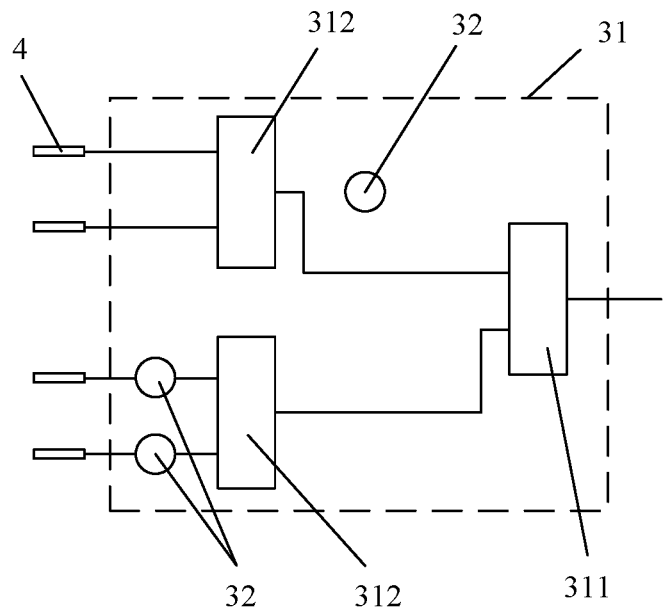
FIG. 6 is a schematic structural diagram of another first power division unit according to Embodiment 2 of the present invention.

Specifically, as shown in FIG. 3, on an output tributary having a phase shifter 32 in each first power division unit 31, a second power divider 312 is connected to the first power divider 311 by using the phase shifter 32; or as shown in FIG. 5, the second power divider 312 is connected to a radiating element 4 by using the phase shifter 32; or as shown in FIG. 6, on some output tributaries of the first power division unit 31, the second power divider 312 is connected to the first power divider 311 by using the phase shifter 32, and on some other output tributaries of the first power division unit 31, the second power divider 312 is connected to the radiating element 4 by using the phase shifter 32.

Specifically, because M radio frequency signals of M radiating elements 4 that are output to a same row need to undergo phase shifting with a same phase, M phase shifters 32 respectively connected to the M radiating elements 4 in the same row form a linkage phase shifter, where the linkage phase shifter is configured to enable multiple radio frequency signals to undergo phase shifting with a same phase, and costs of the linkage phase shifter are lower than those of multiple separate phase shifters.

Figure 7:
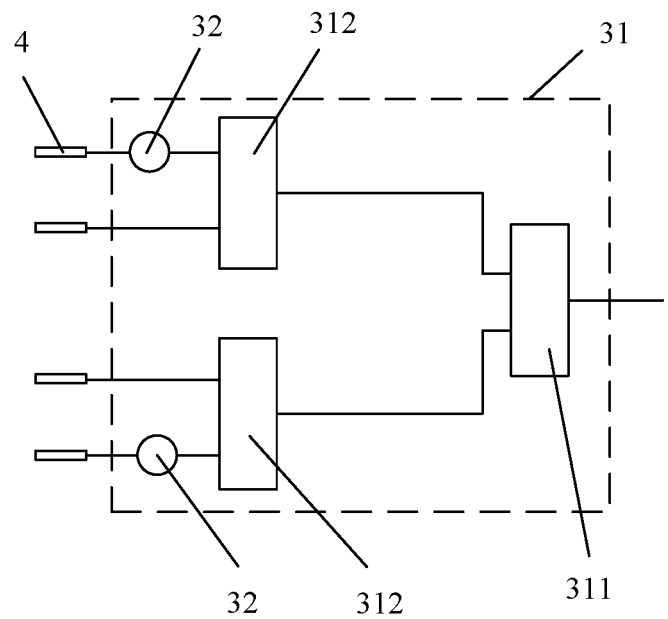
FIG. 7 is a schematic structural diagram of another first power division unit according to Embodiment 2 of the present invention.

It should be noted that, as shown in FIG. 7, in each first power division unit 31, an output tributary having a phase shifter 32 may be separated by an output tributary having no phase shifter 32. In addition, the foregoing radiating element 4 is configured to transmit and receive a radio frequency signal, which may be set in a common symmetric dipole or vertical polarization manner, or in a like manner, and a spacing of the radiating element 4 may be adjusted according to a beam coverage area, which is generally a half wavelength. The foregoing multi-beam antenna system may be extended to a multi input and multiple output (Multi Input and Multiple Output, MIMO) antenna.

Specific working processes and principles of the multi-beam antenna system are the same as those of Embodiment 1. Details are not described herein.

According to the multi-beam antenna system in this embodiment, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area. In addition, to enable the matrix radiating element to radiate radio frequency signals having different phases, there is no need to separately dispose a component used for phase shifting in each radiating element. It is only required that phase adjustment be performed according to a beam requirement of a dimension first, and phase adjustment be then performed according to a beam requirement of another dimension. Phases after two adjustments are overlapped to obtain multiple radio frequency signals having different phases, and finally the matrix radiating element can radiate radio frequency signals having different phases, and therefore may be used together with a linkage phase shifter. Therefore, a quantity of components used for phase shifting in a phase shifting process is relatively small, which reduces complexity of an antenna system and saves costs.

Embodiment 3

Figure 8:
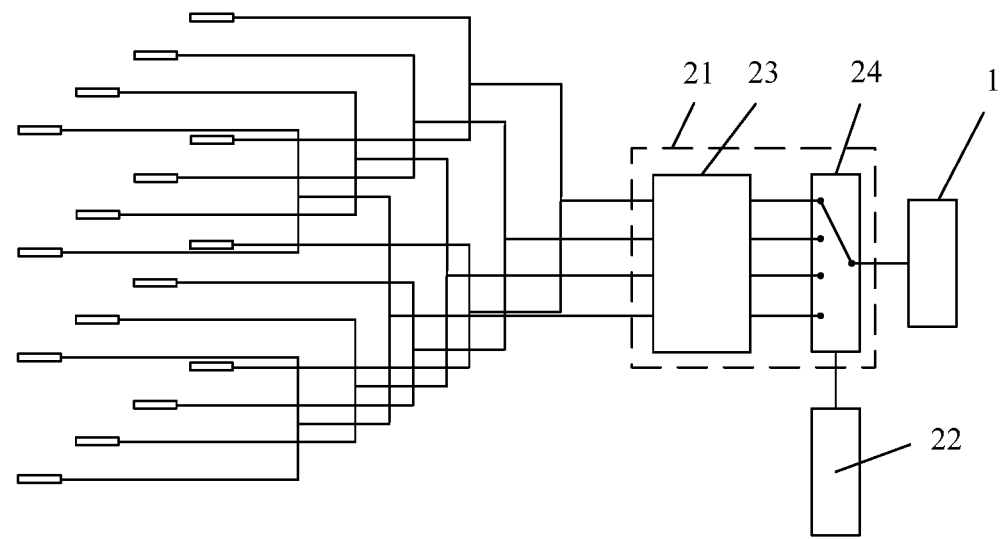
FIG. 8 is a schematic structural diagram of a multi-beam antenna system according to Embodiment 3 of the present invention.

On the basis of Embodiment 1 and Embodiment 2, as shown in FIG. 8, the foregoing multi-beam forming unit 21 may include a butler matrix 23 and a one-of-S switch 24, where the butler matrix 23 is connected to the radio frequency port 1 by using the one-of-S switch 24; the butler matrix 23 includes S input ends, where S is an integer greater than 1; the one-of-S switch 24 includes S output ends, where the S output ends of the one-of-S switch 24 are respectively connected to the S input ends of the butler matrix 23; and the first phase control unit 22 is connected to a control end of the one-of-S switch 24, and the first phase control unit 22 is configured to control the one-of-S switch 24 to select one of the foregoing S output ends for outputting. When radio frequency signals are input to different input ends of the butler matrix 23, the butler matrix 23 has different modes, and in the different modes, phases of radio frequency signals output by the butler matrix 23 are different. Therefore, the one-of-S switch 24 may implement phase adjustment on the radio frequency signals output by the butler matrix 23.

Costs of the foregoing manner of using the butler matrix together with the one-of-S switch are relatively low. In addition, the foregoing multi-beam forming unit may include a second power division unit and a phase-shift unit connected to the foregoing second power division unit, where the phase-shift unit is connected to the first phase control unit. In this case, the first phase control unit directly adjusts a phase for the phase-shift unit to perform phase shifting, that is, the second power division unit enables a radio frequency signal transmitted by the radio frequency port to be converted into M radio frequency signals, and the first phase control unit and the phase-shift unit enable the M radio frequency signals to have different phases.

Specific working processes and principles of the multi-beam antenna system are the same as those of Embodiment 1. Details are not described herein.

According to the multi-beam antenna system in this embodiment, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area. In addition, to enable the matrix radiating element to radiate radio frequency signals having different phases, there is no need to separately dispose a component used for phase shifting in each radiating element. It is only required that phase adjustment be performed according to a beam requirement of a dimension first, and phase adjustment be then performed according to a beam requirement of another dimension. Phases after two adjustments are overlapped to obtain multiple radio frequency signals having different phases, and finally the matrix radiating element can radiate radio frequency signals having different phases, and therefore may be used together with a butler matrix. The butler matrix implements a phase adjustment function for a radio frequency signal by using a bridge, and costs of a bridge are lower than those of a phase shifter.

Embodiment 4

Figure 9:
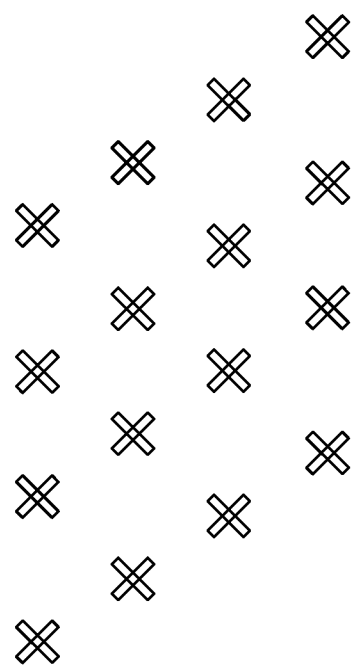
FIG. 9 is a schematic structural diagram of a matrix forming a dual-polarized radiating element according to Embodiment 4 of the present invention.

On the basis of Embodiment 1, Embodiment 2, or Embodiment 3, this embodiment provides a dual-polarized antenna system, including two multi-beam antenna systems described above. As shown in FIG. 9, radiating elements in one multi-beam antenna system and radiating elements in the other multi-beam antenna system are in a one-to-one correspondence to form a dual-polarized radiating element.

Specific working processes and principles of each multi-beam antenna system are the same as those of Embodiment 1. Details are not described herein.

According to the dual-polarized antenna system in this embodiment, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area.

Embodiment 5

On the basis of Embodiment 1, Embodiment 2, or Embodiment 3, this embodiment provides a phase adjustment method for a multi-beam antenna system, where the method is used for the foregoing multi-beam antenna system, and includes:

Step 101: Adjust phases of M radio frequency signals formed by a multi-beam forming unit, so that the foregoing M radio frequency signals have different phases.

Step 102: Perform phase shifting on P radio frequency signals of N radio frequency signals in each first power division unit, and in M first power division units, perform same-phase phase shifting on M radio frequency signals of M radiating elements that are output to a same row.

Specific working processes and principles of the multi-beam antenna system are the same as those of the foregoing embodiment. Details are not described herein.

According to the phase adjustment method for a multi-beam antenna system in this embodiment, a matrix radiating element is formed, and maximum gain directions of two dimensions in the matrix radiating element are respectively adjusted by using a one-dimensional multi-beam forming module and a two-dimensional multi-beam forming module, thereby implementing a relatively large radiation coverage area.

It should be noted that, adjusting a phase of a radio frequency signal radiated by a radiating element may implement adjustment of a beam radiation path; the multi-beam antenna system and the phase adjustment method for a multi-beam antenna system, and the dual-polarized antenna system in the foregoing embodiments are applicable to various application scenarios in which a beam radiation path needs to be adjusted, for example, an indoor WIFI scenario in which a location of a user is not fixed, and a WIFI hotspot needs to adjust a beam radiation path at any time to trace the user; a small cell backhaul antenna scenario in which a backhaul antenna and a base station perform point-to-point transmission, and because a beam is quite narrow, it is difficult to completely align the base station when an antenna is installed; in the multi-beam antenna system in the foregoing embodiments, alignment between the antenna and the base station may be implemented by adjusting a beam radiation path, and robustness of the antenna is increased; and an in-vehicle base station/in-vehicle backhaul antenna scenario in which a vehicle is in a moving state, and a beam radiation path needs to be adjusted at any time to implement alignment between the antenna and the base station.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multi-beam antenna system, comprising:
   a radio frequency port;
   a one-dimensional multi-beam forming module connected to the radio frequency port, wherein the one-dimensional multi-beam forming module comprises a multi-beam forming unit and a first phase control unit connected to the multi-beam forming unit, the multi-beam forming unit is configured to convert a radio frequency signal transmitted by the radio frequency port into M radio frequency signals having different phases, M is an integer greater than 1, the multi-beam forming unit has M output ends configured to respectively output the M radio frequency signals, and the first phase control unit is configured to adjust the phases of the M radio frequency signals;
   a two-dimensional multi-beam forming module connected to the one-dimensional multi-beam forming module, wherein the two-dimensional multi-beam forming module comprises at least one phase shifter, a second phase control unit connected to the at least one phase shifter, and M first power division units respectively connected to the M output ends in the multi-beam forming unit, wherein each first power division unit is configured to divide one radio frequency signal into N radio frequency signals, N is an integer greater than 1, each first power division unit has N output tributaries configured to respectively output the N radio frequency signals, the at least one phase shifter is disposed on a number P of the N output tributaries of each of the M first power division units, where P is an integer greater than or equal to 1 and less than N, and the second phase control unit is configured to adjust a phase for the at least one phase shifter to perform phase shifting; and
   M×N radiating elements connected to the two-dimensional multi-beam forming module, wherein the M×N radiating elements form a matrix having N rows and M columns, the M columns of radiating elements are respectively connected to the M first power division units, with N of the radiating elements in each column respectively connected to the N output tributaries of one of the first power division units, and in the matrix having N rows and M columns, M×P radiating elements are connected to M×P of the output tributaries disposed with the at least one phase shifter.

2. The multi-beam antenna system according to claim 1, wherein
   each first power division unit comprises a first power divider, wherein the first power divider has Q output ends, and the first power divider is configured to divide one radio frequency signal into Q radio frequency signals, wherein Q is an integer greater than 1;
   each first power division unit further comprises Q second power dividers that are respectively connected to the Q output ends of the first power divider, wherein each second power divider comprises R output ends, and each second power divider is configured to divide one radio frequency signal into R radio frequency signals, wherein R is an integer greater than 1, and Q×R=N; and
   in the matrix having N rows and M columns, the N radiating elements in each column of radiating elements are respectively connected to N output ends of the Q second power dividers.

3. The multi-beam antenna system according to claim 2, wherein on an output tributary having an internal phase shifter in each first power division unit, the first power divider is connected to a second power divider by using the internal phase shifter, or a second power divider is connected to a radiating element by using the internal phase shifter.

4. The multi-beam antenna system according to claim 3, wherein M phase shifters respectively connected to M radiating elements of a same row form a linkage phase shifter, wherein the linkage phase shifter is configured to enable multiple radio frequency signals to undergo phase shifting with a same phase.

5. The multi-beam antenna system according to claim 1, wherein
   the multi-beam forming unit comprises a butler matrix and a one-of-S switch, wherein the butler matrix is connected to the radio frequency port by using the one-of-S switch;
   the butler matrix comprises S input ends, wherein S is an integer greater than 1; and the one-of-S switch comprises S output ends, wherein the S output ends of the one-of-S switch are respectively connected to the S input ends of the butler matrix; and
   the first phase control unit is connected to a control end of the one-of-S switch, and the first phase control unit is configured to control the one-of-S switch to select one of the S output ends for outputting.

6. The multi-beam antenna system according to claim 1, wherein the multi-beam forming unit comprises a second power division unit and a phase-shift unit connected to the second power division unit, wherein the phase-shift unit is connected to the first phase control unit.

7. A dual-polarized antenna system, comprising two multi-beam antenna systems according to claim 1; wherein radiating elements in one multi-beam antenna system and radiating elements in the other multi-beam antenna system are in a one-to-one correspondence to form a dual-polarized radiating element.

8. A phase adjustment method for a multi-beam antenna system, wherein the method is used for the multi-beam antenna system according to claim 1 and comprises:
   adjusting phases of M radio frequency signals formed by a multi-beam forming unit, so that the M radio frequency signals have different phases;
   performing phase shifting on the number P of the N radio frequency signals in each first power division unit, and in M first power division units, providing same-phase phase shifting on M radio frequency signals output by M radiating elements that are on a same row.

* * * * *